United States Patent [19]

Kodama et al.

[11] Patent Number: 4,661,260

[45] Date of Patent: Apr. 28, 1987

[54] ENDOTOXIN DETOXIFYING PROCESS

[75] Inventors: Masashi Kodama; Toru Tani, both of Kusatsu; Kazuyoshi Hanazawa, Nagahama; Totaro Oka, Shiga; Kazuo Teramoto, Otsu; Shiro Nishiumi, Kusatsu, all of Japan

[73] Assignee: Toray Industries, Inc., Tokyo, Japan

[21] Appl. No.: 833,421

[22] Filed: Feb. 21, 1986

Related U.S. Application Data

[63] Continuation of Ser. No. 622,522, Jun. 20, 1984, abandoned.

[30] Foreign Application Priority Data

Jun. 24, 1983 [JP] Japan .............................. 58-112695

[51] Int. Cl.$^4$ .............................................. B01D 15/00
[52] U.S. Cl. .................................... 210/679; 210/691; 210/927
[58] Field of Search ............... 210/679, 691, 692, 505, 210/927; 502/401–404

[56] References Cited

U.S. PATENT DOCUMENTS

| | | | |
|---|---|---|---|
| 3,865,678 | 2/1975 | Okamoto et al. | 161/67 |
| 3,959,128 | 5/1976 | Harris | 210/927 |
| 4,276,050 | 6/1981 | Firca et al. | 210/635 |
| 4,305,782 | 12/1981 | Ostreicher et al. | 210/505 |
| 4,347,234 | 8/1982 | Wahlig et al. | 128/335.5 |
| 4,488,969 | 12/1984 | Hou | 210/692 |

OTHER PUBLICATIONS

Watanabe et al: "Immobilization of hen egg—white lysozyme and polypeptide antibiotic polymyxin B for producing antibacterial biomaterials," Artifical Organs (Japan) 9(1), 267-270, (1980), (partial translation).

Issekutz: "Removal of Gran—negative Endotoxin from Solutions by Affinity Chromatography," J. of Immunological Methods, 61, pp. 275-280, (1983).

LaPorte et al: "Inhibition of Escherichia coli Growth and Respiration by Polymyxin B Covalently Attached to Agarose Beads," Biochemistry, 16, No. 8, 1642-1648, (1977).

Primary Examiner—Ivars Cintins
Attorney, Agent, or Firm—Nixon & Vanderhye

[57] ABSTRACT

The present invention provides (1) an endotoxin detoxifying material comprising a fibrous carrier to which Polymixin is fixed, (2) an endotoxin detoxifying material comprising a carrier to which Polymyxin and a basic nitrogen atom are fixed, and (3) a method of removing endotoxin from a fluid by contacting the fluid with the endotoxin detoxifying material comprising a carrier to which Polymixin is fixed.

The present invention makes it possible to contact blood with Polymixin directly and safely and gives a new method of therapy of endotoxemia or prophylaxis of endotoxemia.

3 Claims, No Drawings

ENDOTOXIN DETOXIFYING PROCESS

This is a continuation of application Ser. No. 622,522, filed June 20, 1984, which was abandoned upon the filing hereof.

FIELD OF THE INVENTION

Endotoxin is a lipopolysaccharide derived from cell walls of Gram-negative bacteria and is a substance capable of making a mammal feverish when if enters its blood. Indeed, if the amount is significant, the substance may be fatal. *Escherichia coli*, a typical Gram-negative bacteria usually existing in the bowels, is detoxified by the liver after absorption, and is not found in blood. However, when the liver function lowered, or when a patient receives an anticancer drug, or when a patient is seriously injured such as burned, has surgery or the like, he often suffers from severe bacterial infectious diseases and consequently often shows symptoms of endotoxemia. Further, endotoxemia may also caused by a liver abscess, cholecystitis, etc. too. Moreover, endotoxemia may also result from the use of an indwelling catheter, instruments for artificial dialysis or liquid transfusion equipment which is contaminated with endotoxin. Though the toxicity of Gram-negative bacteria such as *Escherichia coli* and of *Pseudomonas aeruginosa* is not serious in the bowel, its toxicity becomes serious when it enters the blood. Moreover, species of bacteria resistant to antibiotics are increasing, and infection with Gram-negative bacteria causes considerable patient discomfort, lost work and expense. Endotoxin contained in Gram-negative bacteria is very stable against heat and cannot be detoxified by steam-sterilization. Ion exchange resin is known to adsorb endotoxin (James P. Nolan et al, Proceeding of the Society for Experimental Biology and Medicine 149, 766-770 (1975)). However, because the amount of adsorption is not significant, ion exchange resins are not effective for therapy of endotoxemia.

Polymyxin is a known antibiotic for detoxifying endotoxin. Although it is a peptide antibiotic which is not absorbed in the intestine, its use is limited only to oral administration or to local administration because of its strong toxicity to the central nervous system and to the kidneys. Therefore, it cannot be used for endotoxemia therapy, for example by intravenous injection.

It is known that Polymyxin immobilized on polysaccharide beads can absorb endotoxin (Andrew C. Issekutz, Journal of Immunological Methods, 61 (1983)) and that it can suppress the growth of *Escherichia coli* (David C. LaPorte et al. Biochemistry, 16 No. 8 1642-1648 (1977)). Further, it is also known that Polymyxin immobilized on the collagen-synthetic polymer was found to be effective as an anti-bacterial material for medical use (Satosi Watanabe et al, Artificial Organs (Japan) 9 (1) 267-270 (1980)). However, polysaccharide beads cannot be used for endotoxemia therapy because they swell and deform too much in blood and as the result the pressure drop of blood which passes through the highly swelled polysaccharide beads layer become too large. Further, natural products such as protein, polysaccharide, collagen and cellulose cannot be used as carriers of Polymyxin for endotoxemia therapy because such carriers are unstable to heat and chemical treatment such as the type used for sterilization before medical use.

SUMMARY OF THE INVENTION

The present invention provides (1) an endotoxin detoxifying material comprising a fibrous carrier to which Polymyxin is fixed, (2) an endotoxin detoxifying material comprising a carrier to which Polymyxin and a basic nitrogen atom are fixed, and (3) a method of removing endotoxin from a fluid by contacting the fluid with the endotoxin detoxifying material comprising a carrier to which Polymyxin is fixed.

The present invention provides a new endotoxin detoxifying material which can be used safely for therapy of endotoxemia or prophylaxis of endotoxemia.

DETAILED DESCRIPTION OF THE INVENTION

The Polymyxin described herein is an antibiotic substance elaborated by *Bacillus polymyxa* and having anti-bacterial effect against various strains of Gram-negative bacteria, of which Polymyxin A, Polymyxin $B_1$, Polymyxin $B_2$, Polymyxin $D_1$, Polymyxin $E_1$ and Polymyxin $E_2$ are illustrative. See Goodman and Gilman, The Pharmacological Basis of Therapeutics, 5th Edition PP. 1230-1232, Macmillan, 1975.

The fibrous carrier of this invention must be chemically and physically stable during use and has, preferably, a surface area of 0.01 to 100, more preferably 0.05 to 10 $m^2/g$ as well as functional group being capable of fixing Polymyxin. The fibrous carrier which Polymixin adhered to it is typically packed in a column through with the liquid to be treated is passed. Too large a surface area makes the pressure drop of liquid which must pass through column packed with the material too large, and too small surface area makes the detoxifying capacity too small.

A typical example of that is a fibrous carrier which has an islands-in-sea configuration in which the sea component is a polymer capable of attaching the Polymyxin and the islands component is a polymer for reinforcing, preferably of a crystalline poly-alpha-olefin, such as isotactic polypropylene or polyethylene. Examples of the sea component include polystyrene, preferably cross-linked polystyrene having alpha-halogenated acyl group, halogenated benzyl group or isocyanic acid group, acrylic acid-acrylonitrile copolymer, polyvinyl alcohol having carboxyl group, and other polymers or copolymers such as vinylchloride, acrylamide, acrylic acid, acrylonitrile, maleic anhydride, methacrylic acid esters, and so on. Divinylbenzene and methylene-bis-acrylamide are often used as comonomers for crosslinking. Formaldehyde and chlorsulfuric acid are often used for the crosslinking treatment of polystyrene-type polymers. For fixing Polymyxin to the polymer, the polymer is required to contain functional groups such as alpha-halogenated acyl groups, carboxylic groups or carboxylic acid ester groups. These groups may be bonded to the main chain directly or via a side chain such as polyalkylene chain. It is preferable that the side chain is longer than the length of a tetramethylene group.

Among the materials listed, polystyrene derivatives are most suitable for the carrier, because they are very stable against heat and chemical agent such as alkalis and acids. These stabilities are very important for the preparation or regeneration of the endotoxin detoxifying material which, itself, must be free from endotoxin. The islands component is not necessarily essential but effective to maintain mechanical strength of the fibrous carrier during preparation and use. The amount of Polymyxin to be fixed to the carrier is, preferably, more than 10 mg/g or carrier and more preferably, 50-300 mg/g carrier. If the amount is less than 10 mg/g of the carrier, detoxifying may become ineffective. A basic nitrogen atom bonded to the carrier is also effective for detoxifying endotoxin. It absorbs endotoxin or its degradation products which remain undetoxifyied by Polymyxin. The basic nitrogen atom employed in this invention includes primary, secondary, tertiary and quarternary ammonium groups such as a monomethylamino group, monoethylaminoalkyl group, monobutylaminoalkyl group, dimethylaminoalkyl group, diethylaminoalkyl group, trimethylalkylammonium group, triethylalkylamino group, tri-n-propylammoniumalkyl group and tri-n-butylalkylammonium group. The amount of theses group is, preferably, more than 0.1, more preferably more than 0.5 milliequivalent/g adsorbant. The amount of Polymyxin can be very small when the basic nitrogen co-exists on the carrier. It is required to be more than 1 mg/g carrier, preferably 20-300 mg/g carrier.

Though it is preferable that both Polymyxin and the basic nitrogen atom are immobilized on the same carrier, the detoxifying material of this invention may be a mixture of two kinds of material, one of which has immobilized Polymyxin and another having the basic nitrogen atom bonded thereon.

The endotoxin detoxifying material of this invention can be easily prepared by mixing the carrier and Polymyxin, or further adding a peptide condensation agent, such as dicyclohexylcarbodiimide, or 1-ethyl-3-(3-dimethylaminopropyl)-carbodiimide.

For example, (1) by reacting alpha-chlor acetamidemethylated and crosslinked polystyrene fiber (obtained by treating the polystyrene fiber with solution containing formaldehyde, N-methyl-alpha-chloracetamide and sulfuric acid) with Polymyxin at a pH over 7, followed by reacting it with amine or (2) by treating the succinated fiber (obtained by aminating the above-mentioned alpha-chloracetamidemethylated and crosslinked polystyrene fiber with the mixture of the primary diamine and the secondary amine and by succinating it with succinic acid anhydride) with Polymyxin under a peptide-condensing agent. The material of this invention is used for removal of endotoxin such as from liquids for transfusion, dialysis liquids, drugs, as well as to treat or for prophylaxis of endotoxemia. These liquids, such as blood, may be passed or circulated through column packed with the material. Another example of the use of the material of the invention includes a method in which a catheter is covered with the material.

The invention will be further explained in the folowing examples in which all parts and percentages are by weight and all temperatures reported in centigrade degrees.

EXAMPLE 1

Islands-in-sea type composite fiber (number of filaments; 42; thickness of each filament: 2.6 denier; number of the islands in each filament: 16; tensile strength: 2.9 g/d; breaking elongation: 50%) comprising 50 weight parts of sea component (mixture of 46 parts (by weight hereinunder) of polystyrene ("Styrene" 666) and 4 parts of polypropylene (Sumitomo "Nobren" WF-727-F)) and 50 parts of islands component (Mitsui "Nobren" J3HG)) was reacted in a mixed solution comprising 50 g of N-methylol-alpha-chloracetamide, 400 g of nitrobenzene, 400 g of 98% sulfuric acid and 0.85 g of paraformaldehyde at 20° C. for one hour. Then, the fiber was taken out and thrown into 5 liters of ice water at 0° C. to stop the reaction. After that, the fiber was washed with water and extracted with methanol so that the fibers became free from nitrobenzene. The resulting fibers were dried in vacuo at 50° C. 71 g of chloracetamidemethylated dry fiber were obtained (Fiber A).

4.8 g (80 pieces of 500,000 units) of Polymyxin B Pfizer (Pfizer Taito Co., Ltd.) was dissolved in 400 ml of water, and 11 g of Fiber A was added to it, followed by 5 hours of shaking. Then 1.5 g of magnesium oxide was added thereto, followed by 60 hours shaking at room temperature. Thereafter, the fiber was taken out from the mother liquor, and washed in a column with 4800 ml of 0.1 N-hydrochloric acid. The amount of Polymyxin contained in the washings and the mother liquor was determined by the microbiuret method. The difference of the amount of Polymyxin applied and found in the above liquids is considered to be the amount of Polymyxin fixed on the carrier. The reacted fiber was further washed with 25 liters of water and 6 liters of physiological saline. Polymyxin B-fixed fiber (Fiber B) was obtained. The amount of fixed Polymyxin was 110 mg/g.

EXAMPLE 2

Two grams of Fiber B were added to 20 ml of 0.5 mg/ml aqueous solution of lipopolysacchride of *Escherichia coli* 0111:B4 (purchased from Difco Labo.; by the phenol extraction method), followed by 60 minutes of shaking at 37° C. Then, 1 ml of the supernatant was administered to ICR mice by intravenous injection and the mortality after 48 hours was inspected. As the result, 4 mice, out of 13 (31%) were found dead. A similar test was conducted with Fiber A instead of Fiber B, and 11 mice out of 11 (100%) were found dead. From the result, it is obvious that the Polymixin-fixed fiber detoxify the toxicity of lipopolysaccharide.

EXAMPLE 3

Two grams of Fiber B were added to 20 ml of a 0.5% aqueous solution of *Eschericia coli* 026:B6 (purchased from Difco Labo.; by the phenol extraction method), followed by shaking for 60 minutes at 37° C. After that, 1 ml of the supernatant was administered to each ICR mouse by intravenous injection, and after 48 hours, the mortality was observed. As the result, 1 mouse (12.5%) out of 8 was found dead. In contrast, when the aqueous solution which was not treated by fiber B was administered in the same manner, 12 mice (92%) out of 13 were found dead. It is evident that the Polymyxin fixed fiber detoxied the toxicity of the lipopolysaccharide.

EXAMPLE 4

Five grams of Fiber B of 10 mm length were bundled and packed in a column (3.6 cm inner diameter×5 cm height) for hemoperfusion.

Mongrel adult dogs (7-9 kg of body weight) underwent direct hemoperfusion through the column connected with a tube-pump between the femoral artery and the femoral vein at a flowing rate of blood of 50 ml/min. under anesthesia. Saline containing 0.01% of lipopolysaccharide of *Escherichia coli* 0111:B4 (purchased from Difco Labo.; by the phenol extraction method; 0.5 mg/kg of their body weight) was administered by intravenous drip injection for 60 minutes to their forepaw from 15 minutes after beginning the perfusion, while heparin was administered one hundred units per hour per kilogram of their body weight as an anti-coagulant. The perfusion was performed for 2 hours. Two dogs out of ten were found dead after 24 hours. In contrast, when Fiber A or Fiber C was used in place of Fiber B in the above experiment, 5 dogs out of 5 died in both case. When 5 dogs were administered the liposaccharide and the heparin under anesthesia without perfusion, all dogs died. They showed typical symptoms of endotoxin-shock, that is, the blood-pressure went on dropping as soon as the administration of lipopolysaccharide began.

EXAMPLE 5

4.8 g of Polymyxin B sulfate (purchased from Sigma Chemicl Co.; 8000 units/mg) were dissolved in 600 ml water and 25 g of Fiber A were added therein, followed by 5 hours shaking. Then 1.5 g of magnesium oxide were added thereto, followed by 12 hours shaking at room temperature. Thereafter, the fiber was taken out from the mother liquor, packed in a column and washed with 4800 ml of 0.1 N-hydrochloric acid. Polymyxin B-fixed fiber (Fiber D) was obtained. The amount of fixed Polymyxin on Fiber D was determined by the same method of Example 1. It was 39 mg/g.

Fiber D was immersed in 50% dimethylamine aqueous solution and heated at 55° C. for 4 hours. Then the fiber was washed with water, 1 N-hydrochloric acid, water and 0.17 M-phosphate-buffer (pH 7.4) in this order. An endotoxin-detoxifying material-N1 containing 2.1 milliequivalent amino group per gram was obtained.

EXAMPLE 6

34 g of Fiber A were immersed in the solution obtained by dissolving 23.7 g of dodecamethylene diamine in 1050 ml of 50% dimethylamine aqueous solution and was left for 72 hours at room temperature. Then the fiber was taken out and washed sufficiently with diluted hydrochloric acid and water. A mixed aminated fiber (Fiber E) was obtained. Fiber E contained 2.27 millimole dimethylamine and 0.16 millimole dodecamethylene diamine per gram per gram fiber. These values were determined by the fiber's ion exchange capacity and the amount of functional group acetylated with acetic anhydride in pyridine.

30 g of Fiber E were treated with 1N-sodium hydroxide aqueous solution, sufficiently washed with water, and dried. An acid-free fiber was obtained. 23.4 g of the acid free fiber were immersed in 400 ml of dimethylformamide containing 6.0 g succinic anhydride and heated for 5 hours at 50° C., and washed. A succinyl fiber was obtained.

20 g of the dry succinyl fiber were immersed in 250 ml of aqueous Polymyxin B (purchased from Sigma Chemical Co.) solution (15 mg/ml) and 500 mg of 1-ethyl-3-(3-dimethylaminopropyl)carbodiimide was added thereto little by little in three hours. During the addition, the pH of the solution was kept between 4.5 to 6.0 with 1N-sodium hydroxide or 1 N-hydrochloric acid. Then the reaction mixture was agitated at room temperature for 5 days. The fiber was packed in a column and washed with 4 liters of water and 1 liter of phosphate buffer solution. An endotoxin- detoxifying material-N2 was obtained. Polymyxin fixed on the fiber was 119 mg/g fiber. This value was determined by the same manner as Example 1.

EXAMPLE 7

Each of 2 g of the endotoxin-detoxifying material-N1 and N2 were added to 20 g of 0.5 mg/ml saline solution of lipopolysaccharide of *Escherichia coli* 055:B5 (purchased from Difco Labo.; by the trichloracetic extraction method) separately and were shaken at 37° C. for 60 minutes. Then each of the 1 ml supernatant was administered to ICR mice by intravenous injection and the mortality after 48 hours was inspected. On the other hand, Fiber D, Fiber E and ion exchange resin (IRA-938) were studied in the same manner in place of said materials. The results are shown in Table 1. The concentration of saccharide in the supernatant was determined by phenol-sulfuric acid method (1 ml of the supernatant+1 ml of 5% aqueous phenol+5 ml of 98% sulfuric acid; 485 millimicron), and the concentration of endotoxin was determined by Toxicolor Test (purchased from Seikagaku Kogyo Co. Ltd., Japan).

Table 1 reveals the following results: (1) Polymyxin fixed on the fiber (Fiber D) neutralyzes but does not absorb endotoxin, (2) both the anion exchange fiber (Fiber E) and anion exchange resin adsorb polysaccharide but reduce lethality only slightly, and (3) the endotoxin detoxifying materials (N1 and N2) which have both the Polymyxin and basic nitrogen atom thereon both have the ability for the neutralization and adsorption of endotoxin.

TABLE 1

| Material | Mouse Lethality dead/total | Concentration Endotoxin mg/ml | Concentration Saccharide mg/ml |
| --- | --- | --- | --- |
| Material-N1 | 2/15 | 0.11 | 0.14 |
| Material-N2 | 0/15 | 0.065 | 0.065 |
| Fiber D | 7/15 | 0.16 | 0.50 |
| Fiber A | 15/15 | 0.50 | 0.50 |
| Fiber E | 12/15 | 0.41 | 0.11 |
| Ion Exchange Resin IRA-938 | 14/15 | 0.45 | 0.29 |

We claim:

1. A method of removing endotoxin from a fluid by passing the endotoxin-containing fluid through a column filled with an endotoxin detoxifying material consisting essentially of a fibrous carrier having functional groups thereon to which Polymyxin is fixed and immobilized through the functional groups of the fibrous carrier.

2. A method of removing endotoxin according to claim 1, wherein the fluid is blood, plasma or serum.

3. A method of removing endotoxin from blood or plasma, comprising the successive steps of:
   (a) removing blood or plasma from a mammal under conditions which prevent coagulation;
   (b) contacting the blood or plasma with an endotoxin detoxifying material consisting essentially of fibrous carrier having functional groups thereon to which Polymyxin is fixed and immobilized through the functional groups of the fibrous carrier;
   (c) separating the blood or plasma from the endotoxin detoxifying material; and
   (d) returning the blood or plasma to the mammal.

* * * * *